Nov. 2, 1971  J. M. DAVIES  3,616,833
EVAPORATION OF LIQUOR
Filed Dec. 12, 1968

United States Patent Office 3,616,833
Patented Nov. 2, 1971

3,616,833
EVAPORATION OF LIQUOR
John Moseley Davies, Lavender Cottage, Weedon Lane, Amersham, Buckinghamshire, England
Filed Dec. 12, 1968, Ser. No. 783,275
Int. Cl. B01d 1/00, 1/26, 1/28
U.S. Cl. 159—2 MS                     10 Claims

ABSTRACT OF THE DISCLOSURE

Part of a liquor is evaporated using a first heat-exchanger in which heat is transferred from a refrigerant to an intermediate fluid. A second heat-exchanger is provided to receive the heated intermediate fluid from the first heat-exchanger and a supply of the liquor to be processed. Heat is transferred from the intermediate fluid to the liquor and the liquor is partly vaporized in the second heat-exchanger. The vapor portion of the liquor is then supplied to a third heat-exchanger in which heat is transferred from the vapor to a refrigerant. A compressor is arranged to receive the vaporized refrigerant from the third heat-exchanger whereby it is liquified and returned to the first heat-exchanger.

---

Figure 1:
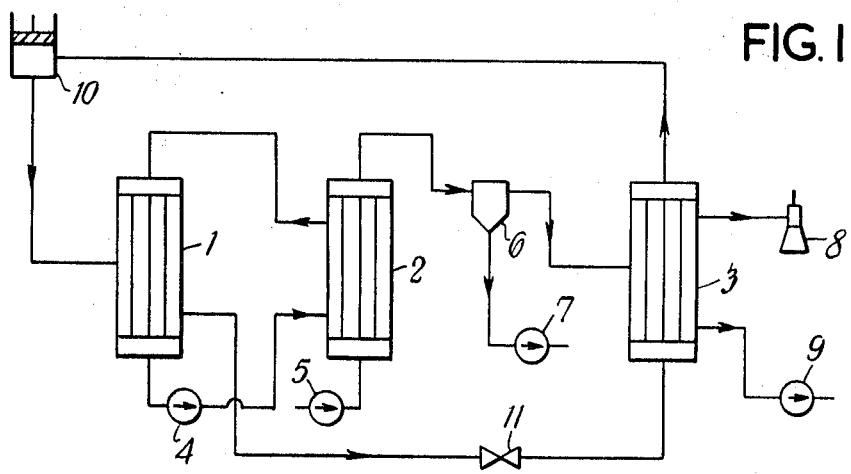

This invention relates to evaporation of liquor.

According to one aspect of the invention, there is provided an apparatus for evaporating some of a liquor, including first, second and third heat-exchangers, means for supplying an intermediate fluid to the first heat-exchanger in order to heat the fluid and for supplying the heated liquid leaving the first heat-exchanger to the second heat-exchanger, means for passing said liquor through the second heat-exchanger to be heated by said material, means for separating vapour from the liquid that leaves the second heat-exchanger, means for supplying vapour separated from the liquor to the third heat-exchanger, means for supplying a refrigerant at least mainly in liquid form to the third heat-exchanger where at least part of the liquid content of it is vapourised by heat extracted from said vapour, a compressor for compressing vapourised refrigerant that leaves the third heat-exchanger and means for supplying the compressed vapourised refrigerant to the first heat-exchanger in which it condenses and heats said liquid, whereafter it returns to the third heat-exchanger.

According to another aspect of the invention, there is provided a method of evaporating some of a liquor in which there are employed first, second and third heat-exchangers, an intermediate fluid is supplied to the first heat-exchanger and is there heated, the heated fluid leaving the first heat-exchanger is supplied to the second heat-exchanger, said liquor is passed through the second heat-exchanger and is there heated by said fluid, vapour is separated from the liquor that leaves the second heat-exchanger, vapour separated from the liquor is supplied to the third heat-exchanger, refrigerant at least mainly in liquid form is supplied to the third heat-exchanger where at least part of the liquid content of it is vapourised by heat extracted from said vapour, a compressor compresses vapourised refrigerant that leaves the third heat-exchanger and the compressed vapourised refrigerant is supplied to the first heat-exchanger in which is condenses and heats said liquid, whereafter it returns to the third heat-exchanger.

The fluid which is heated in the first heat-exchanger may, for example, be water, and it is in fact referred to only as water in the following description, but it could instead be another liquid for example a mineral oil.

A closed circuit is provided for the refrigerant and it is preferable to provide another one for the water so that it flows endlessly through the first and second heat-exchangers. The material that flows from the first heat-exchanger to the second is preferably simply hot water, although it could be steam if the refrigerant is appropriate.

The means for separating vapour from the liquor that leaves the second heat-exchanger could be a separator from which the vapour flows directly to the third heat-exchanger and from which the liquor is pumped away as a concentrated product. Instead, however, there could be one or more intermediate evaporation stages between the separator and the third heat-exchanger. A third possibility is to have one or more flash-evaporation stages between the second and third heat-exchangers.

If the liquor is such that it must not come into contact with inexpensive carbon steel, the first heat-exchanger may be constructed of such steel and the second heat-exchanger, and any further heat-exchanger through which the liquor passes, may be made of stainless steel. The heat-exchangers may be of the plate type or of the tube and shell type, with tubes of circular cross-section or flat tubes. The first heat-exchanger is preferably of the horizontal tube and shell type, with finned tubes.

Three examples in accordance with the invention are described below and diagrammatically illustrated in FIGS. 1 to 3 of the accompanying drawings.

In the apparatus according to FIG. 1, there are three heat-exchangers 1, 2 and 3 of the tube and shell type. There is a closed circuit for water and it is pumped around the closed circuit by a pump 4, through the tubes of the heat-exchanger 1 in which it is heated and through the shell of the heat-exchanger 2 in which hot water leaving the heat-exchanger 1 is cooled by heat exchange with the liquor to be concentrated, which is supplied by a pump 5 to the tubes of the heat-exchanger 2, in which some of the liquor is vapourised. The hot liquor leaving the tubes of the heat-exchanger 2 with the vapour passes to a liquor separator 6, from which concentrated liquor is drawn and pumped away by a pump 7. The separated vapour, for example at 100° F., flows into the shell of the heat-exchanger 3 under the action of a steam/air ejector 8. Some of the vapour condenses in the heat-exchanger 3 and the condensate is pumped away by a pump 9 whilst the uncondensed vapour is drawn off by the steam/air ejector 8. In the heat-exchanger 3, the heat in the vapour evaporates at least some of the liquid content of a refrigerant that is supplied wholly in liquid form or mainly in liquid form, i.e. with some vapour in it, to the tubes of the heat-exchanger 3. The evaporated refrigerant, for example at 90° F., leaving the heat-exchanger 3 passes to a compressor 10 and compressed refrigerant vapour leaving the compressor flows into the shell of the heat-exchanger 1, in which it heats the water and the refrigerant vapour is itself condensed. The liquid refrigerant then flows through an expansion valve 11 to the tubes of the heat-exchanger 3, so that it has a closed circuit.

The temperature of the vapour passing from the separator vessel 6 to the heat-exchanger 3 could be 100° C. or even higher, provided that a suitable refrigerant is used.

If desired, the single heat-exchanger 2 could be replaced by two heat-exchangesrs, connected in series or in parallel, so far as the flow of liquor to be evaporated is concerned, the two heat-exchangers in the case of parallel operation being connected to the one separator vessel 6 or to two different separator vessels both of which supply vapour to the heat-exchanger 3.

It is possible to dispense with the pumps 4 and 7 and to use flow under gravity from a head tank for the water and simply to let the concentrated liquor run out of the separator vessel 6 through a pipe.

Figure 2:
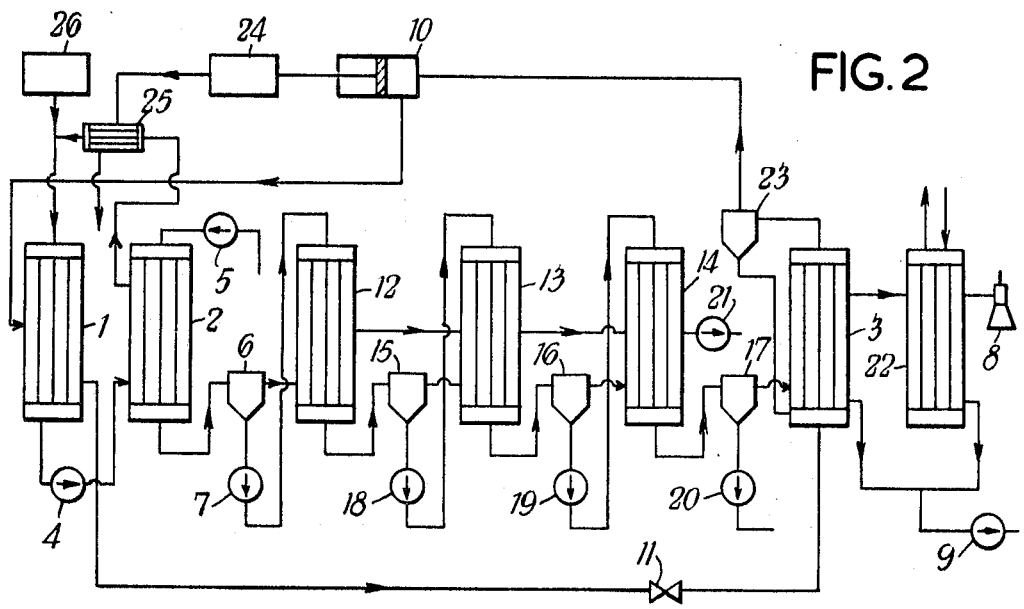

In FIG. 2, the numbers 1 to 11 indicate parts corresponding to the similarly numbered parts in FIG. 1. In the apparatus according to FIG. 2, however, there are three further heat-exchangers including a fourth heat-exchanger 12, a fifth heat-exchanger 13, and a sixth heat-exchanger 14 each being of the tube and shell type and three further liquor separator vessels 15, 16 and 17 with pumps 18, 19 and 20 associated with them. Concentrated liquor leaving the separator vessel 6 is pumped by the pump 7 into the tubes of the heat-exchanger 12, where it takes heat from the vapour leaving the vessel 6, which passes into the shell of the heat-exchanger 12, so that more of the liquor evaporates in the tubes of the heat-exchanger 12. The liquor and vapour is supplied from the tubes of the heat-exchanger 12 to the separator vessel 15, and the vapour from the shell of the heat-exchanger 12 passes with some condensate to the shell of the heat-exchanger 13. To the latter shell there is also supplied vapour from the separator vessel 15 whilst concentrated liquor is pumped from the vessel 15 into the tubes of the heat-exchanger 13 by the pump 18. Liquor and the further vapour generated in the heat-exchanger 13 pass from the tubes of that heat-exchanger into the separator vessel 16 and vapour passes into the shell of the heat-exchanger 14 from the vessel 16 and also, with some condensate, from the shell of the heat-exchanger 13, whereas concentrated liquor is pumped by the pump 19 from the vessel 16 into the tubes of the heat-exchanger 14, from which tubes liquor with more vapour in it passes into the separator vessel 17. The material leaving the shell of the heat-exchanger 14, all of it condensed, is pumped away by a pump 21 and concentrated liquor is pumped from the vessel 17 by a pump 20. The vapour separated from the liquor in the vessel 17 is supplied to the shell of the heat-exchanger 3, where part of it is condensed and the condensed part is pumped away by the pump 9 and the uncondensed part proceeds to the shell of a further tube and shell type heat-exchanger 22 which forms a final liquor vapour condensing means, in which it is further condensed by water flowing through the tubes. The condensate is pumped away by the pump 9 and the vapour and noncondensibles including air are drawn off by the steam/air ejector 8.

The refrigerant supplied wholly or mainly in liquid form to the tubes of the heat-exchanger 3 is evaporated there, as in the example according to FIG. 1, but in case it is not all evaporated it is advantageous to have a separator vessel 23 connected to the outlet of the tubes, so that the refrigerant vapour can proceed from the vessel 23 and the unvapourised fraction can return to the tubes of the heat-exchanger 3.

The compressor 10 is in this case driven by a Diesel engine 24 and some of the waste heat from the engine is given up in a heat-exchanger 25 to the water flowing from the heat-exchanger 2 to the heat-exchanger 1. Hot water is supplied from a head tank 26 to the tubes of the heat-exchanger 1, to make up for losses.

The example according to FIG. 2 could be modified by arranging for the liquor to be concentrated to be supplied to the heat-exchanger 14 and to flow through the heat-exchangers 14, 13 and 12, in that order, whilst the vapour flows through these heat-exchangers in the order 12, 13 and 14.

Figure 3:
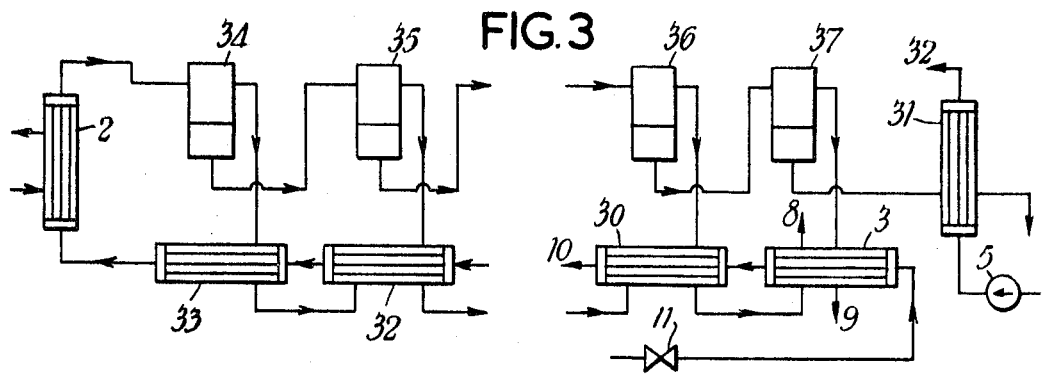

In the example according to FIG. 3, the shell of the heat-exchanger 2 receives hot water and cooler water flows out of it, as in the example according to FIG. 2. The parts 1, 4, 10 and 24 to 26 are present as in the example according to FIG. 2 but are not shown in FIG. 3. The tubes of the heat-exchanger 3 receive refrigerant wholly or mainly in liquid form from the valve 11 as before and condensate and residual vapour from the shell of the heat-exchanger 3 leave by way of the parts 9 and 8 as shown in FIG. 1. Some of the refrigerant liquid evaporates in the heat-exchanger 3 and the rest, or most of the rest, in the tubes of another tube and shell type heat-exchanger 30, which are connected in series with the tubes of the heat-exchanger 3, after which the refrigerant vapour proceeds to the compressor 10.

The liquor to be evaporated is fed by the pump 5 at 85° F. to the tubes of a tube and shell type heat-exchanger 31, which it leaves at 94° F., and then passes through the tubes of a series of tube and shell type heat exchangers, that form a liquor preheating means. Only the last two of these heat-exchangers are shown, referenced 32 and 33. The liquor becomes progressively hotter and leaves the heat-exchanger 33 at 178° F. It then flows into the tubes of the heat-exchanger 2, in which it is further heated by heat exchange with the hot water. It flows from the heat-exchanger 2 at 195° F. into a plurality of flash evaporators arranged in a series, the first of which is a chamber 34 in which flash evaporation takes place. The vapour thus produced, at 190° F., flows into the shell of the heat-exchanger 33, from which condensate flows into the shell of the heat-exchanger 32, through the shells of all the other heat-exchangers in the series and eventually through the shells of the heat-exchangers 30 and 3. The residual liquid from the chamber 34 flows to another chamber 35 at 190° F. and further flash evaporation takes place in that chamber, the vapour thus produced flowing at 185° F. to the shell of the heat-exchanger 32, from which condensate flows through the shells of the series of heat-exchangers and the shells of the heat-exchangers 30 and 3, and the residual liquid leaving the chamber 35 flows to another chamber, not shown, where further flash evaporation takes place, and so on, there being a series of chambers in which flash evaporation takes place, the last two being referenced 36 and 37 and supplying vapour separated from the liquor at 104° F. and 100° F., respectively, to the heat-exchangers 30 and 3, respectively, for evaporating the refrigerant liquid in them. Residual liquid from the chamber 37 passes at 100° F. to the shell of the heat-exchanger 31, there to heat the incoming liquor.

In each of the examples described above, the refrigerant may be ammonia. "Freon" (a registered trademark) or "Arcton 11," "Arcton 12," "Arcton 21" or "Arcton 22" ("Arcton" is a registered trademark).

Also, in each example there may be an additional heat-exchanger or other source of heat, not shown, for heating the liquid refrigerant leaving the valve 11 when starting up the apparatus, in order that in the starting phase sufficient refrigerant vapour is supplied to the compressor. In each example, to obtain a thermal balance it may be necessary to have another heat-exchanger to remove some heat from the compressed vapour leaving the compressor, before it is supplied to the heat-exchanger 1. Additionally or alternatively, in the example according to FIG. 1, only some of the vapour leaving the separator vessel 6 may be supplied to the heat-exchanger 3, the remainder being used for some other purpose or discharged as waste. Also, control of the process can be exercised by discharging a controlled quantity of hot water from the closed circuit and making god the deficiency with cold water. This applies to all examples.

If desired, steam may pass from the heat-exchanger 1 to the heat-exchanger 2, instead of hot water.

The compressor could in each example be driven by a Diesel engine or a gas turbine, the waste heat of the engine or turbine being utilised for heating the water before and/or after it flows through the heat-exchanger 1. Alternatively, the compressor could be driven by an electric motor.

In each example, a proportion of the concentrated liquor, instead of flowing out of the apparatus as a final product, would be passed through the apparatus again to be further concentrated.

I claim:

1. An apparatus for evaporating part of a liquor comprising a first heat-exchanger means for transferring heat from a refrigerant to an intermediate fluid, a second heat-exchanger means arranged to receive a supply of the liquor and to receive said heated intermediate fluid from said first heat-exchanger means for transferring heat from said intermediate fluid to liquor, said heat partly vaporizing said liquor, a liquid-vapor separator for separating the resulting concentrated liquor from its vapor, a third heat-exchanger means arranged to receive the vapor portion of said liquor from said liquid-vapor separator and to receive said refrigerant from said first heat-exchanger while it is at least mainly in liquid form for transferring heat from said liquor vapor to said refrigerant whereby at least part of said refrigerant is vaporized, a compressor means arranged to receive said vaporized refrigerant from said third heat-exchanger means for compressing said refrigerant, said compresor means being connected to said first heat-exchanger means to return said compressed refrigerant thereto, and a refrigerant separator arranged to receive refrigerant from said third heat-exchanger means wherein said refrigerant is separated into a vapor portion and a liquid portion, said refrigerant separator being connected to said compressor means whereby the vapor portion is supplied thereto and said refrigerant separator being further connected to said third heat-exchanger means whereby the liquid portion of said refrigerant is returned to said third heat-exchanger.

2. An apparatus for evaporating part of a liquor comprising a first heat-exchanger means for transferring heat from a refrigerant to an intermediate fluid, a second heat-exchanger means arranged to receive a supply of the liquor and to receive said heated intermediate fluid from said first heat-exchanger means for transferring heat from said intermediate fluid to said liquor, said heat partly vaporizing said liquor, a liquid-vapor separator for separating the resulting concentrated liquor from its vapor, a third heat-exchanger means arranged to receive the vapor portion of said liquor from said liquid-vapor separator and to receive said refrigerant from said first heat-exchanger while it is at least mainly in liquid form for transferring heat from said liquor vapor to said refrigerant whereby at least part of said refrigerant is vaporized, a compressor means arranged to receive said vaporized refrigerant from said third heat-exchanger means for compressing said refrigerant, said compressor means being connected to said first heat-exchanger means to return said compressed refrigerant thereto, and a final liquor vapor condensing means arranged to receive the non-condensed portion of said liquor vapor from said third heat-exchanger means and to receive a cooling fluid for indirectly condensing at least part of said non-condensed portion of said liquor and for transferring heat from said condensing vapor to said intermediate fluid, said final liquor vapor condensing means comprising at least one heat-exchanger.

3. A method of evaporating a liquor comprising transferring heat from a refrigerant to an intermediate fluid by passing said refrigerant and said intermediate fluid through a first heat-exchanger, transferring sufficient heat to partly vaporize the liquor from said intermediate fluid to said liquor by passing said heated intermediate fluid from said first heat-exchanger and a supply of said liquor through a second heat-exchanger, separating the liquid and vapor portions of said liquor, vaporizing at least part of said refrigerant by passing the vapor portion of said liquor from said second heat-exchanger and said refrigerant while it is at least mainly in liquid form through a third heat-exchanger, liquifying said vaporized refrigerant by compressing it, returning said refrigerant to said first heat-exchanger, and separating said refrigerant into vapor and liquid portions after passing it through said third heat-exchanger by passing it through a separator and supplying the vapor portion of said refrigerant to said compressor while supplying the liquid portion of said refrigerant to said third heat-exchanger.

4. A method of evaporating a liquor comprising transferring heat from a refrigerant to an intermediate fluid by passing said refrigerant and said intermediate fluid through a first heat-exchanger, transferring sufficient heat to partly vaporize the liquor from said intermediate fluid to said liquor by passing said heated intermediate fluid from said first heat-exchanger and a supply of said liquor through a second heat-exchanger, separating the liquid and vapor portions of said liquor, vaporizing at least part of said refrigerant by passing the vapor portion of said liquor from said second heat-exchanger and said refrigerant while it is at least mainly in liquid form through a third heat-exchanger, liquifying said vaporized refrigerant by compressing it, returning said refrigerant to said first heat-exchanger, indirectly condensing at least part of the non-condensed portion of said liquor vapor from said third heat-exchanger by passing it through another heat-exchanger, passing a cooling fluid through said other heat-exchanger and thereby transferring heat from said non-condensed liquor vapor to said cooling fluid.

5. An apparatus for evaporating part of a liquor comprising a first heat-exchanger means for transferring heat from a refrigerant to an intermediate fluid, a second heat-exchanger means arranged to receive a supply of the liquor and to receive said heated intermediate fluid from said first heat-exchanger means for transferring heat from said intermediate fluid to said liquor, said heat partly vaporizing said liquor, a plurality of flash evaporators arranged in a series, the first of said flash evaporators being arranged to receive liquor from said second heat-exchanger means and each of the other flash evaporators in said series being arranged to receive the liquid portion of said liquor discharged from the preceding flash evaporator in said series, a third heat-exchanger means arranged to receive a vapor portion of said liquor from the last flash evaporator in said series and to receive said refrigerant from said first heat-exchanger while it is at least mainly in liquid form for transferring heat from said liquor vapor to said refrigerant whereby at least part of said refrigerant is vaporized, and a compressor means arranged to receive said vaporized refrigerant from said third heat-exchanger means for compressing said refrigerant, said compressor means being connected to said first heat-exchanger means to return said compressed refrigerant thereto.

6. An apparatus as set forth in claim 5 further comprising a liquor preheating means arranged to receive said supply of liquor and to receive vapor from at least one of said flash evaporators for preheating said liquor supply before it reaches said second heat-exchanger means, said liquor preheating means comprising at least one heat-exchanger.

7. An appartus as set forth in claim 5 further comprising a supplementary refrigerant heating means arranged to receive said refrigerant from said third heat-exchanger means and to receive vapor from at least one of said flash evaporators for supplementary heating of said refrigerant before it reaches said compressor means, said supplementary refrigerant heating means comprising at least one heat-exchanger.

8. A method of evaporating a liquor comprising transferring heat from a refrigerant to an intermediate fluid by passing said refrigerant and said intermediate fluid through a first heat-exchanger, transferring heat from said intermediate fluid to said liquor by passing said heated intermediate fluid from said first heat-exchanger and a supply of said liquor through a second heat-exchanger, evaporating a portion of said liquor by passing said liquor through a series of flash evaporators after it has passed through said second heat-exchagner, the liquid portion of said liquor discharged from each flash evaporator in the said series being supplied to the next flash evaporator in said series, supplying vapor from said last flash evaporator in said series to a third heat-exchanger, and vaporizing at least part of said refrigerant by passing said refrigerant while it is at least mainly in liquid form through said third heat-exchanger and transferring heat to said refrigerant from the vapor supplied from said last flash evaporator, liquifying said vaporized refrigerant by compressing it, and returning said refrigerant to said first heat-exchanger.

9. A method as set forth in claim 8 further comprising preheating said liquor before it reaches said second heat-exchanger by transferring heat to it from vapor taken from at least one of said flash evaporators.

10. A method as set forth in claim 8 further comprising supplementarily heating said refrigerant before it is compressed by transferring heat to it from vapor taken from at least one of said flash evaporators.

References Cited

UNITED STATES PATENTS

| | | | |
|---|---|---|---|
| 2,703,610 | 3/1955 | Cross | 159—17 |
| 2,777,514 | 1/1957 | Ecksfrom | 159—17 |
| 3,243,359 | 3/1966 | Schmidt | 202—174 |
| 3,261,766 | 7/1966 | Sherwood | 203—11 |
| 3,399,118 | 8/1968 | Williamson | 202—173 |
| 3,461,460 | 8/1969 | McGrath | 202—173 X |
| 3,118,775 | 1/1964 | Byer et al. | 99—205 |

FOREIGN PATENTS 163,549   5/1921   Great Britain.

OTHER REFERENCES

Building Heating With Refrigeration Equipment Power, June 16, 1931, pp. 948, 949.

NORMAN YUDKOFF, Primary Examiner

J. SOFER, Assistant Examiner

U.S. Cl. X.R.

159—17, 20, 46; 202—174